(12) United States Patent
Seo

(10) Patent No.: US 7,422,382 B2
(45) Date of Patent: Sep. 9, 2008

(54) CAMERA MODULE

(75) Inventor: Tae Jun Seo, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 404 days.

(21) Appl. No.: 11/156,583

(22) Filed: Jun. 21, 2005

(65) Prior Publication Data

US 2006/0181633 A1 Aug. 17, 2006

(30) Foreign Application Priority Data

Feb. 16, 2005 (KR) .................... 10-2005-0012674

(51) Int. Cl.
G03B 17/00 (2006.01)
G03B 3/00 (2006.01)
G03B 13/00 (2006.01)
G02B 7/04 (2006.01)
G02B 5/04 (2006.01)

(52) U.S. Cl. .................. 396/529; 396/144; 396/335; 359/829

(58) Field of Classification Search ............. 396/144, 396/335, 529; 348/360; 359/819, 822, 829; 352/231
See application file for complete search history.

(56) References Cited

U.S. PATENT DOCUMENTS

| 6,737,292 B2 | 5/2004 | Seo | |
| 2005/0068456 A1* | 3/2005 | Ohta et al. | 348/360 |
| 2005/0271375 A1* | 12/2005 | Watanabe et al. | 396/144 |

FOREIGN PATENT DOCUMENTS

| CN | 1722784 A | 1/2006 |
| JP | 01-184951 A | 7/1989 |
| JP | 2003-101042 A | 4/2003 |
| JP | 2003-347531 A | 12/2003 |
| JP | 2005-012327 | 1/2005 |
| KR | 2004-63431 | 7/2004 |

(Continued)

OTHER PUBLICATIONS

English Abstract of Korean Patent No. 50595, Korean Publication No. 1992-0000578, filed Jan. 16, 1992.

(Continued)

*Primary Examiner*—Melissa Jan Koval
(74) *Attorney, Agent, or Firm*—Lowe Hauptman Ham & Berner

(57) ABSTRACT

A camera module comprises a lens array including at least one lens, a lens accommodating unit having an inner space, in which the lens array is arranged, and an incident hole, and a housing mounted on a circuit board. The housing has a counter-engagement part engaged with an engagement part formed at the lens accommodating unit such that the lens accommodating unit is moved in the direction of the optical axis. An image sensor has an image area on which light is focused. The image sensor is electrically connected to the circuit board. A filter is disposed between the lens array and the image sensor. The filter includes a transparent medium through which light introduced along the optical axis is transmitted to the image area, and a prevention film for preventing electromagnetic waves generated by the image sensor from being emitted out of the housing.

21 Claims, 10 Drawing Sheets

FOREIGN PATENT DOCUMENTS

WO 2004/003618 A1 1/2004

OTHER PUBLICATIONS

Korean Intellectual Property Office, Office Action, mailed Aug. 30, 2006.

Chinese Intellectual Property Office, Office Action mailed Jun. 8, 2007 and English Translation.

Japanese Patent Office, Office Action mailed Feb. 19, 2008 and English Translation.

* cited by examiner

CAMERA MODULE

RELATED APPLICATIONS

The present application is based on, and claims priority from, Korean Application Number 2005-12674, filed Feb. 16, 2005, the disclosure of which is incorporated by reference herein in its entirety.

BACKGROUND OF THE INVENTION

1. Field of the Invention

The present invention relates to a camera module, and, more particularly to a camera module having a structure for preventing electromagnetic waves generated in the camera module from being emitted out of the camera module and preventing external electromagnetic waves and noise from being introduced into the camera module, wherein the structure is simplified without using additional parts, whereby assembly of the camera module is improved, the manufacturing costs of the camera module are reduced, and the size of the camera module is decreased.

2. Description of the Related Art

Generally, a camera module comprises a lens unit including at least one lens, a housing in which the lens unit is mounted, a sensor unit including an infrared (IR) filter and an image sensor, and a protection unit for shielding the image sensor.

FIG. 1a is an exploded perspective view illustrating a conventional camera module, and FIG. 1b is an assembled perspective view illustrating the conventional camera module. As shown in FIGS. 1a and 1b, a lens unit 110 comprises a lens 112, a barrel 114 in which the lens 112 is mounted, and a cap 116 disposed at the outer circumferential surface of the upper end of the barrel 114, the cap 116 having an incident hole 116a formed through the center of the upper surface thereof.

It should be noted that two or more lenses 112 might be mounted in the barrel 114 based on function and performance of the camera module to be realized.

Preferably, the cap 116 is fitted on the outer circumferential surface of the upper end of the barrel 112 in a threaded engagement fashion such that the opened upper end of the barrel 114 is partially blocked by the cap 116 so as to prevent the lens 112 mounted in the barrel 114 from being separated from the barrel 114.

A housing 122 has an inner hole 124 for accommodating the barrel 114. The inner hole 124 is provided at the inner circumferential surface thereof with a female thread part 124a, which is threadly engaged with a male thread part 114a formed at the outer circumferential surface of the barrel 114 such that the barrel 114 is securely mounted in the inner hole 124, and thus, the lens unit 110 is securely mounted in the housing 122 in a threaded engagement fashion. As a result, the barrel 114 can be moved relative to the housing 122, which is stationary, in the direction of an optical axis.

Under the housing 122 is disposed a sensor unit 130, which focuses an image of a subject introduced through the lens 112 and converts the focused image into an electric signal.

To this end, the sensor unit 130 comprises an image sensor 132, an infrared (IR) filter 134 and a circuit board 136. The image of the subject introduced through the lens 112 is partially filtered by the IR filter 134, and is then sensed by the image sensor 132.

The image sensor 132 is electrically connected to the circuit board 136, such as a flexible printed circuit board (FPCB), which is an image signal transmitting device. Consequently, the image of the subject sensed by the image sensor 132 is converted into an electric signal by the image sensor 132, and is then transmitted to a display unit (not shown), such as a liquid crystal display (LCD), through the circuit board 136 such that the image is displayed on the display unit.

A protection unit 140, which shields the image sensor 132 for preventing injurious electromagnetic waves from being emitted out of the camera module, comprises: an upper shield can 141 mounted to the housing 122; and a lower shield can 142 having engagement protrusions 144, which are resiliently engaged in engagement holes 143 formed at the upper shield can 141.

Consequently, electromagnetic waves generated from the image sensor 132 are prevented from being emitted out of the camera module by the protection unit 140 comprising the upper and lower shield cans 141 and 142. As a result, the electromagnetic waves are prevented from affecting electronic parts adjacent to the camera module, and therefore, inducing communication jamming.

Preferably, the circuit board 136 is coated with silver paste or is formed with a ground wire. In this case, the silver paste prevents external noise or external electromagnetic waves from being introduced into the circuit board 136 such that the external noise or the external electromagnetic waves do not affect the circuit part of the circuit board 136. The external noise or the external electromagnetic waves are transmitted out of the circuit board 136 through the ground wire formed at the circuit board 136. As a result, communication jamming due to the external electromagnetic waves and malfunction of the circuit due to the external noise are effectively prevented.

However, the protection unit 140 is divided into the upper and lower shield cans 141 and 142, which are made of metal, and therefore, it is necessary to assemble the protection unit 140 such that the image sensor 132 is shielded by the protection unit 140 in an additional assembly line. As a result, the number of components of the camera module is large, and the assembly process is complicated, which deteriorates productivity of the camera module. Furthermore, it is difficult to decrease the size of the camera module according to demand for miniaturization.

SUMMARY OF THE INVENTION

Therefore, the present invention has been made in view of the above problems, and it is an object of the present invention to provide a camera module having a structure for preventing injurious electromagnetic waves generated in the camera module from being emitted out of the camera module and preventing external injurious electromagnetic waves from being introduced into the camera module, wherein the structure is simplified without using additional parts, whereby productivity of the camera module is improved, the manufacturing costs of the camera module are reduced, and the size of the camera module is decreased.

In accordance with one aspect of the present invention, the above and other objects can be accomplished by the provision of a camera module comprising: a lens array including at least one lens; a lens accommodating unit having an inner space defined therein such that the lens array is arranged along an optical axis in the inner space and an incident hole formed at the center of the front surface thereof a housing mounted on the upper surface of a circuit board, the housing having a counter-engagement part engaged with an engagement part formed at the lens accommodating unit such that the lens accommodating unit is moved in the direction of the optical axis; an image sensor having an image area on which light passing through the lens array is focused, the image sensor being electrically connected to the circuit board such that the image focused on the image area is transmitted to the circuit board; and a filter disposed between the lens array and the image sensor, the filter including a transparent medium through which light introduced along the optical axis is directly transmitted to the image area of the image sensor, and a prevention film for preventing electromagnetic waves generated by the image sensor disposed in the housing from being emitted out of the housing; wherein the engagement part of the lens accommodating unit is a male thread part formed at the outer circumferential surface of the lens accommodating unit, and wherein the counter-engagement part of the housing is a female thread part formed at the inner hole of the housing.

Preferably, the lens accommodating unit comprises: a hollow cylindrical barrel, in which the lens array is arranged, the barrel having the engagement part formed at the outer circumferential surface thereof, which is engaged with the counter-engagement part formed at an inner hole of the housing; and a cap having a male thread part formed at the outer circumferential surface thereof, which is threadly engaged with a female thread part formed at the inner circumferential surface of the barrel for fixing the lens array, the cap having the incident hole formed at the center of the front surface thereof.

Preferably, the housing is attached to the upper surface of the circuit board by a conductive bonding agent.

Preferably, the image sensor is mounted to the circuit board by metal wires in a wire bonding fashion.

Preferably, the image sensor is mounted to the circuit board by bonding bumps in a flip chip bonding fashion.

Preferably, the prevention film is a conductive layer uniformly coated on an entire area of the upper or lower surface of the transparent medium.

Preferably, the prevention film is a conductive film bonded to an entire area of the upper or lower surface of the transparent medium.

More preferably, the prevention film is made of Indium Tin Oxide (ITO).

Preferably, the filter is attached to the housing by a conductive bonding agent.

Preferably, the filter is attached to the upper surface of the image sensor by a conductive bonding agent.

In accordance with another aspect of the present invention, there is provided a camera module comprising: a lens array including at least one lens; a lens accommodating unit having an inner space defined therein such that the lens array is arranged along an optical axis in the inner space and an incident hole formed at the center of the front surface thereof a housing mounted on the upper surface of a circuit board such that the housing is connected to at least one ground terminal of the circuit board, the housing having a counter-engagement part engaged with an engagement part formed at the lens accommodating unit such that the lens accommodating unit is moved in the direction of the optical axis; an image sensor having an image area on which light passing through the lens array is focused, the image sensor being electrically connected to the circuit board such that the image focused on the image area is transmitted to the circuit board; and a filter disposed between the lens array and the image sensor, the filter including a transparent medium through which light introduced along the optical axis is directly transmitted to the image area of the image sensor, and a prevention film for preventing electromagnetic waves generated by the image sensor disposed in the housing from being emitted out of the housing; wherein the engagement part of the lens accommodating unit is a male thread part formed at the outer circumferential surface of the lens accommodating unit, and wherein the counter-engagement part of the housing is a female thread part formed at the inner hole of the housing.

Preferably, the lens accommodating unit comprises: a hollow cylindrical barrel, in which the lens array is arranged, the barrel having the engagement part formed at the outer circumferential surface thereof, which is engaged with the counter-engagement part formed at an inner hole of the housing; and a cap having a male thread part formed at the outer circumferential surface thereof, which is threadly engaged with a female thread part formed at the inner circumferential surface of the barrel for fixing the lens array, the cap having the incident hole formed at the center of the front surface thereof.

Preferably, the housing is made of a material containing a conductive material.

Preferably, the housing has a conductive layer of a conductive material uniformly coated on an entire area of the inner or outer surface thereof, the conductive layer of the housing being electrically connected to the at least one ground terminal of the circuit board.

Preferably, the housing is attached to the at least one ground terminal of the circuit board by a conductive bonding agent.

Preferably, the image sensor is mounted to the circuit board by metal wires in a wire bonding fashion.

Preferably, the image sensor is mounted to the circuit board by bumps in a flip chip bonding fashion.

Preferably, the prevention film is a conductive film bonded to an entire area of the upper or lower surface of the transparent medium.

More preferably, the prevention film is made of Indium Tin Oxide (ITO).

Preferably, the filter is attached to the housing by a conductive bonding agent.

Preferably, the filter is attached to the upper surface of the image sensor by a conductive bonding agent.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1A:
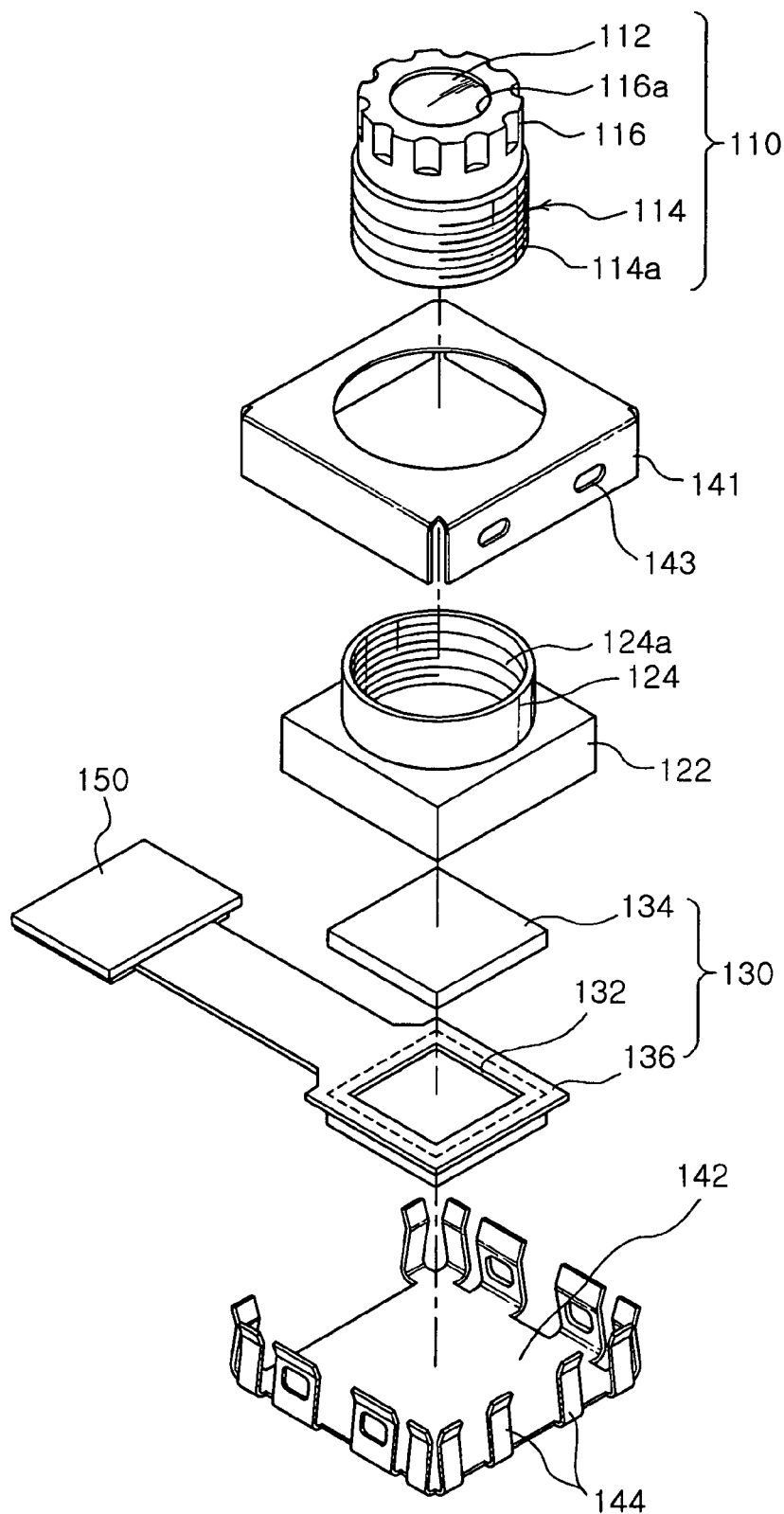
FIG. 1a is an exploded perspective view illustrating a conventional camera module.
Figure 1B:
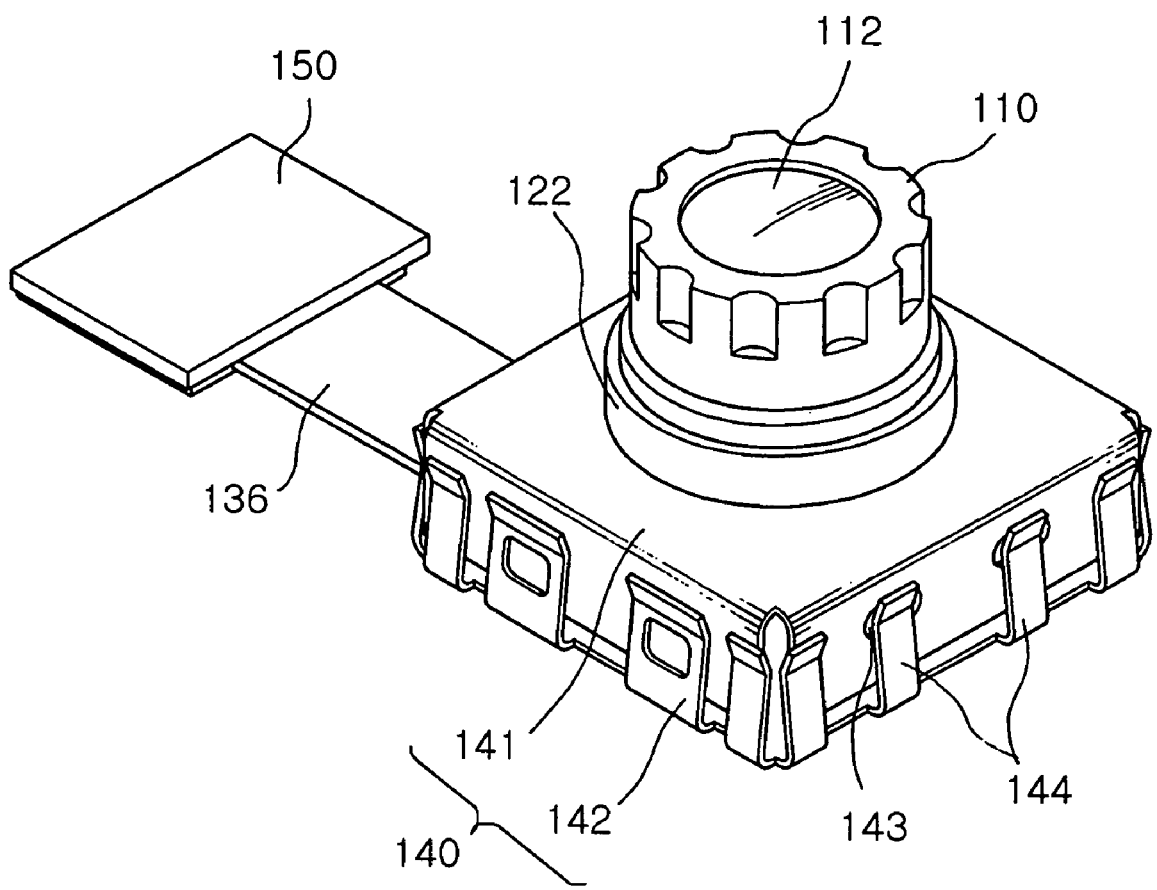
FIG. 1b is an assembled perspective view illustrating the conventional camera module.
Figure 2A:
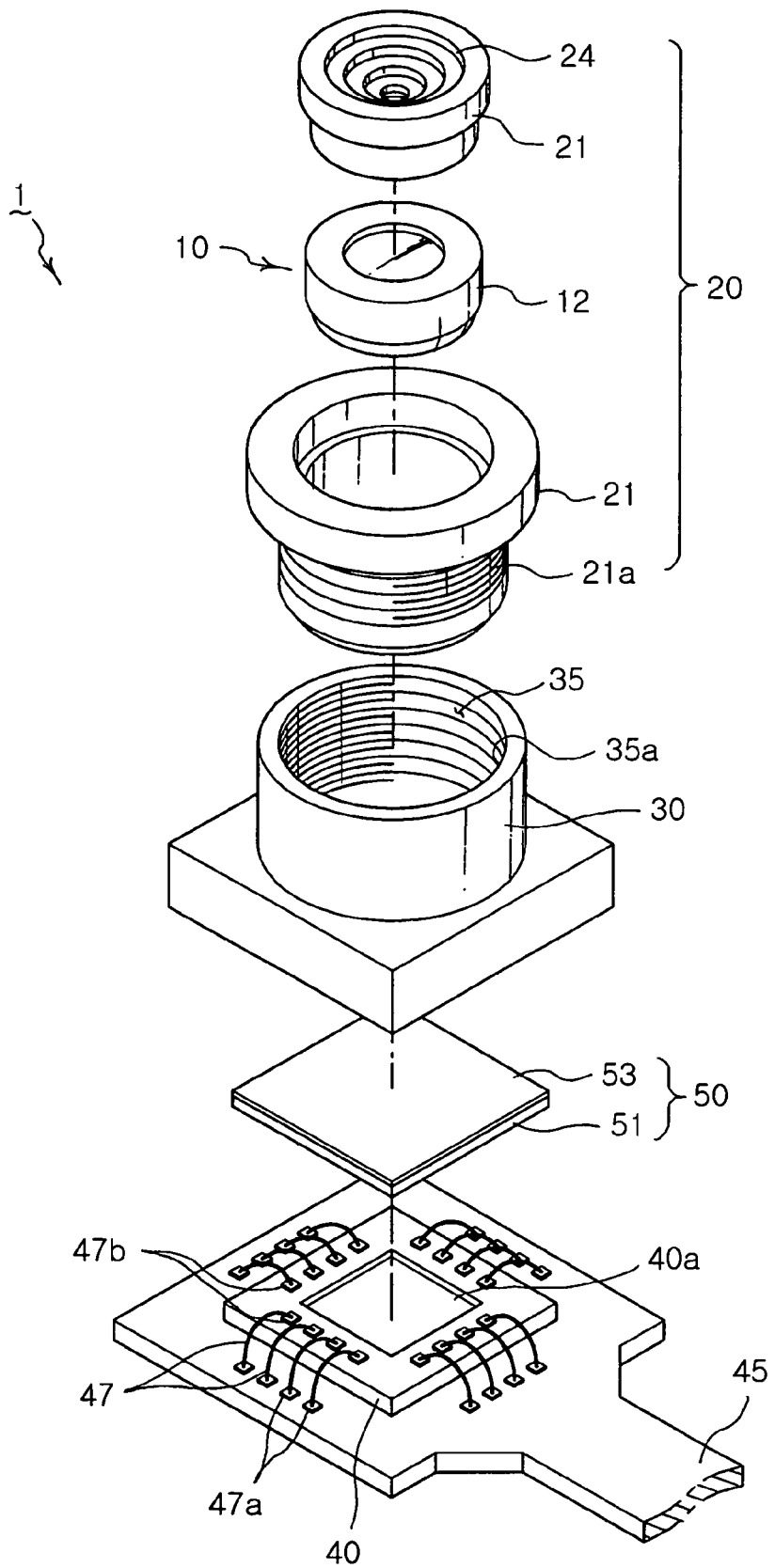
FIG. 2a is an exploded perspective view illustrating a camera module according to a first preferred embodiment of the present invention.
Figure 2B:
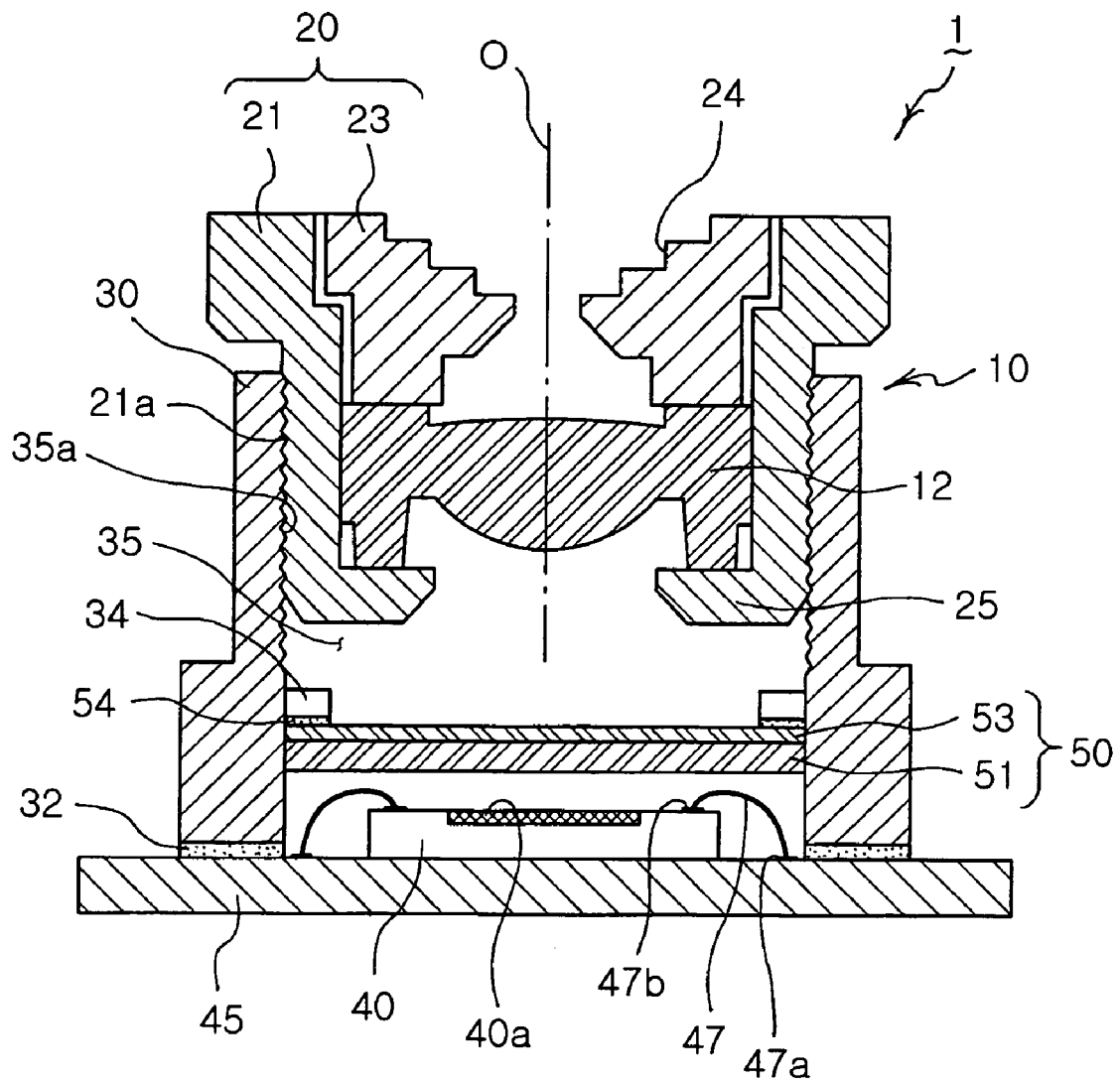
FIG. 2b is an assembled sectional view illustrating the camera module according to the first preferred embodiment of the present invention.

FIG. 2a is an exploded perspective view illustrating a camera module 1 according to a first preferred embodiment of the present invention, and FIG. 2b is an assembled sectional view illustrating the camera module 1 according to the first preferred embodiment of the present invention.

As shown in FIGS. 2a and 2b, the camera module 1 according to the first preferred embodiment of the present invention comprises a lens array 10, a lens accommodating unit 20, a housing 30, an image sensor 40, and a filter 50.

The lens array 10 includes at least one lens 12 arranged along the optical axis O and disposed in the lens accommodating unit 20.

Preferably, a plurality of lenses 12 may be arranged in the lens accommodating unit 20. In this case, spacers are disposed between the respective lenses 12 such that the lenses 12 are spaced uniformly apart from each other.

The lens accommodating unit 20 has an incident hole 24 of a predetermined size, which is formed at the center of the front surface thereof such that center of the incident hole 24 is aligned with the optical axis O. Also, the lens accommodating unit 20 has an inner space of a predetermined size, in which the lens 12 of the lens array 10 is arranged along the optical axis O.

The lens accommodating unit 20 comprises: a hollow cylindrical barrel 21, in which the lens array 10 is arranged along the optical axis O, the barrel 21 having an engagement part, i.e., a male thread part 21a, formed at the outer circumferential surface thereof, which is threadly engaged with a counter-engagement part, i.e., a female thread part 35a formed at the inner circumferential surface of an inner hole 35 formed at the housing 30; and a cap 23 threadly engaged in the upper end of the barrel 21 for fixing the lens array 10, the cap 23 having the incident hole 24 formed at the center of the front surface thereof.

At the lower end of the barrel 21 is formed a stopper 25, which extends inward by a predetermined length such that the lower end of the lens array 10 comes into contact with the stopper 25 when the cap 23 is threadly engaged in the upper end of the barrel 21.

In the illustrated embodiment, the cap 23 is threadly engaged in the upper end of the barrel 21, although the cap 23 may be threadly engaged in the lower end of the barrel 21.

The housing 30 is a stationary member including the inner hole 35 having the counter-engagement part, i.e., the female thread part 35a formed at the inner circumferential surface thereof, which is threadly engaged with the engagement part, i.e., the male thread part 21a, formed at the outer circumferential surface of the barrel 21 of the lens accommodating unit 20 such that the lens accommodating unit 20 can be moved in the direction of the optical axis. The housing 30 is mounted to the upper surface of the circuit board 45 by a bonding agent 32, such as epoxy resin.

Preferably, the bonding agent 32, which is used to securely fix the housing 30 to the circuit board 45, is a conductive bonding agent, such as anisotropic conductive paste (ACP) or anisotropic conductive film (ACF).

On the surface of the circuit board 45 are printed various circuit patterns. The image sensor 40 is mounted to one end of the circuit board 45. To the other end of the circuit board 45 is attached a connector (not shown), via which the circuit board 45 is easily connected to another electronic part.

The image sensor 40 has an image area 40a disposed at the upper surface thereof, on which light passing through the lens array 10 of the lens accommodating unit 20 is collected. The image sensor 40 is electrically connected to the circuit board 45 such that the image focused on the image area 40a of the image sensor 40 is converted into an electric signal, and is then transmitted to the display unit.

In the illustrated embodiment, the circuit board 45 is a flexible printed circuit board (FPCB) of a small thickness, although the circuit board 45 may be a common printed circuit board (PCB).

The light passing through the lens array 10 is focused on the image area 40a of the image sensor 40, and then the image focused on the image area 40a of the image sensor 40 is transmitted to the display unit through the circuit board 45, to which the image sensor 40 is electrically connected.

According to the first preferred embodiment of the present invention, the image sensor 40 is mounted to the circuit board 45 as follows. As shown in FIGS. 2a and 2b, a plurality of bonding pads 47a formed at the upper surface of the circuit board 45 is electrically connected to a plurality of bonding pads 47b formed at the upper surface of the image sensor 40 by metal wires 47 in a wire bonding fashion.

Figure 3A:
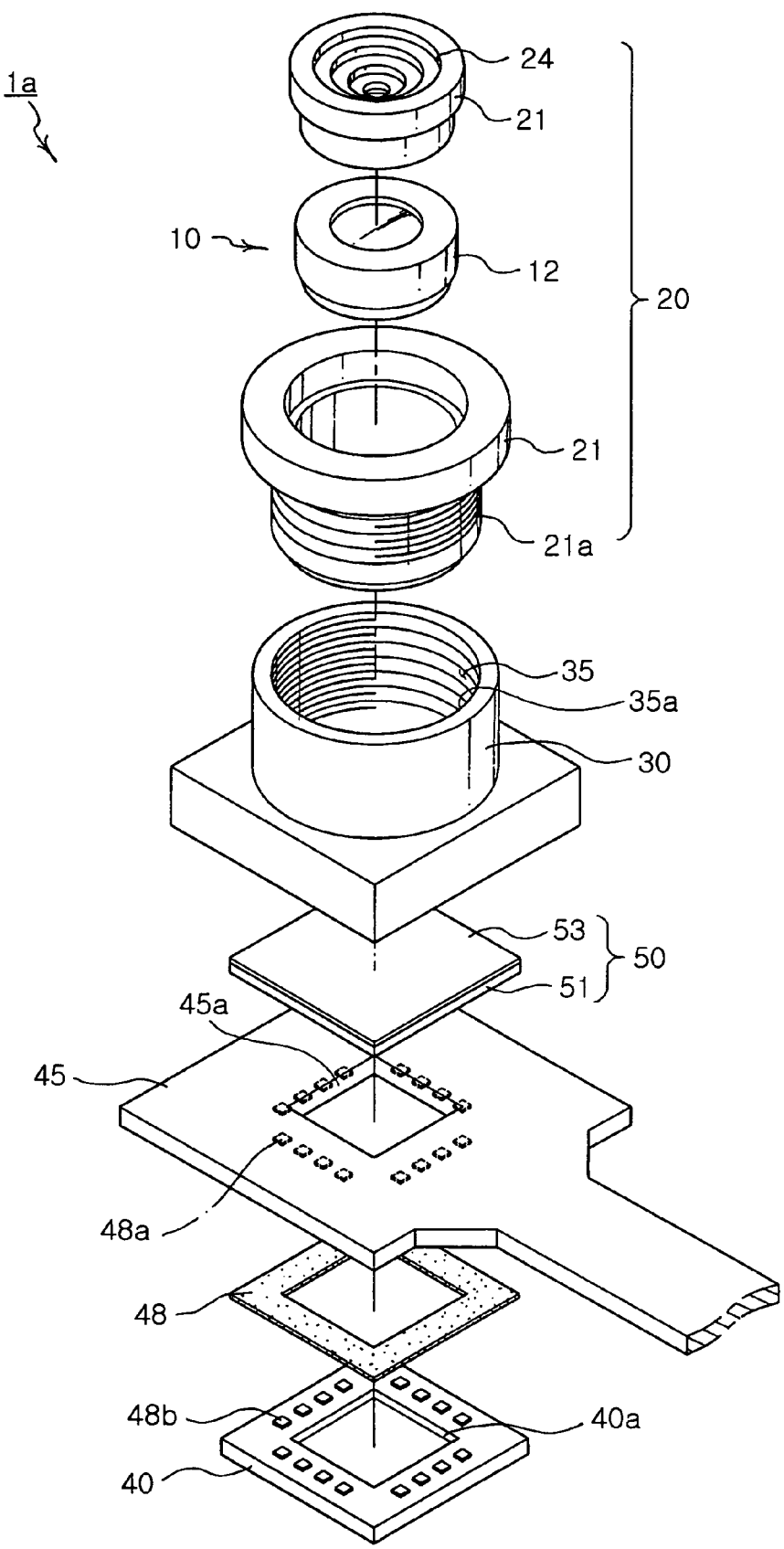
FIG. 3a is an exploded perspective view illustrating a camera module according to a second preferred embodiment of the present invention.
Figure 3B:
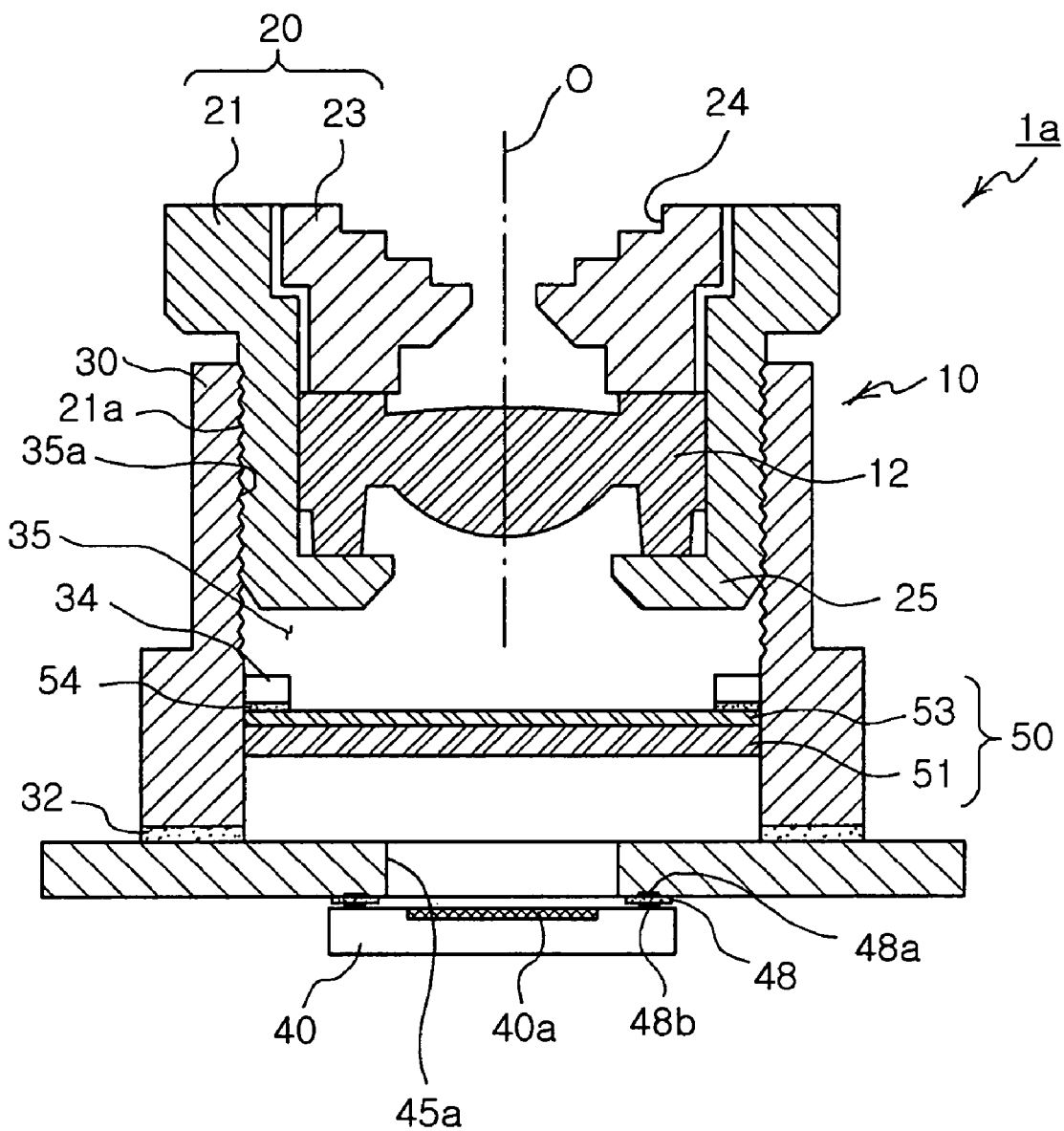
FIG. 3b is an assembled sectional view illustrating the camera module according to the second preferred embodiment of the present invention.

FIG. 3a is an exploded perspective view illustrating a camera module 1a according to a second preferred embodiment of the present invention, and FIG. 3b is an assembled sectional view illustrating the camera module 1a according to the second preferred embodiment of the present invention.

As shown in FIGS. 3a and 3b, the camera module according to the second preferred embodiment of the present invention comprises an image sensor 40 and a circuit board 45. The circuit board 45 is provided at the upper surface thereof with a plurality of bonding pads 48a. Similarly, the image sensor 40 is provided at the upper surface thereof with a plurality of bonding bumps 48b. The bonding pads 48a of the circuit board 45 are electrically connected to the bonding bumps 48b of the image sensor 40, respectively, by a bonding agent 48 applied between the circuit board 45 and the image sensor 40 in a flip chip bonding fashion. Preferably, the bonding agent 48 is a conductive bonding agent, such as anisotropic conductive paste (ACP) or anisotropic conductive film (ACF).

At one end of the circuit board 45, to the lower surface of which the image sensor 40 is mounted in the flip chip bonding fashion, is formed a window part 45a of a predetermined size, through which the image area of the image sensor is exposed to the lens array 10.

The camera module according to the second preferred embodiment of the present invention further comprises a filter 50 disposed between the lens array 10 and the image sensor 40. The filter 50 comprises: a transparent medium 51 through which light introduced along the optical axis O is directly transmitted to the image area 40a; and a prevention film 53 for preventing injurious electromagnetic waves generated by the image sensor 40 disposed in the housing 30 from being emitted out of the housing 30.

The transparent medium 51 is a glass filter disposed between the lowermost lens 12 of the lens array 10 and the image sensor 30 for filtering ultraviolet rays included in the light collected on the image sensor 40.

The prevention film 53 is a conductive film uniformly applied to an entire area of the upper or lower surface of the transparent medium 51. Preferably, the prevention film 53 is made of indium tin oxide (ITO).

The filter 50 is attached to a fixing part 34 formed at the inner circumferential surface of the housing 30 by a bonding agent 54. Preferably, the bonding agent 54 is a conductive bonding agent, such as anisotropic conductive paste (ACP) or anisotropic conductive film (ACF).

When the image sensor 40 is mounted to the lower surface of the circuit board 45 in a flip chip bonding fashion, it is also possible to attach the filter 50 to the upper surface of the image sensor by the conductive bonding agent 54.

Figure 4A:
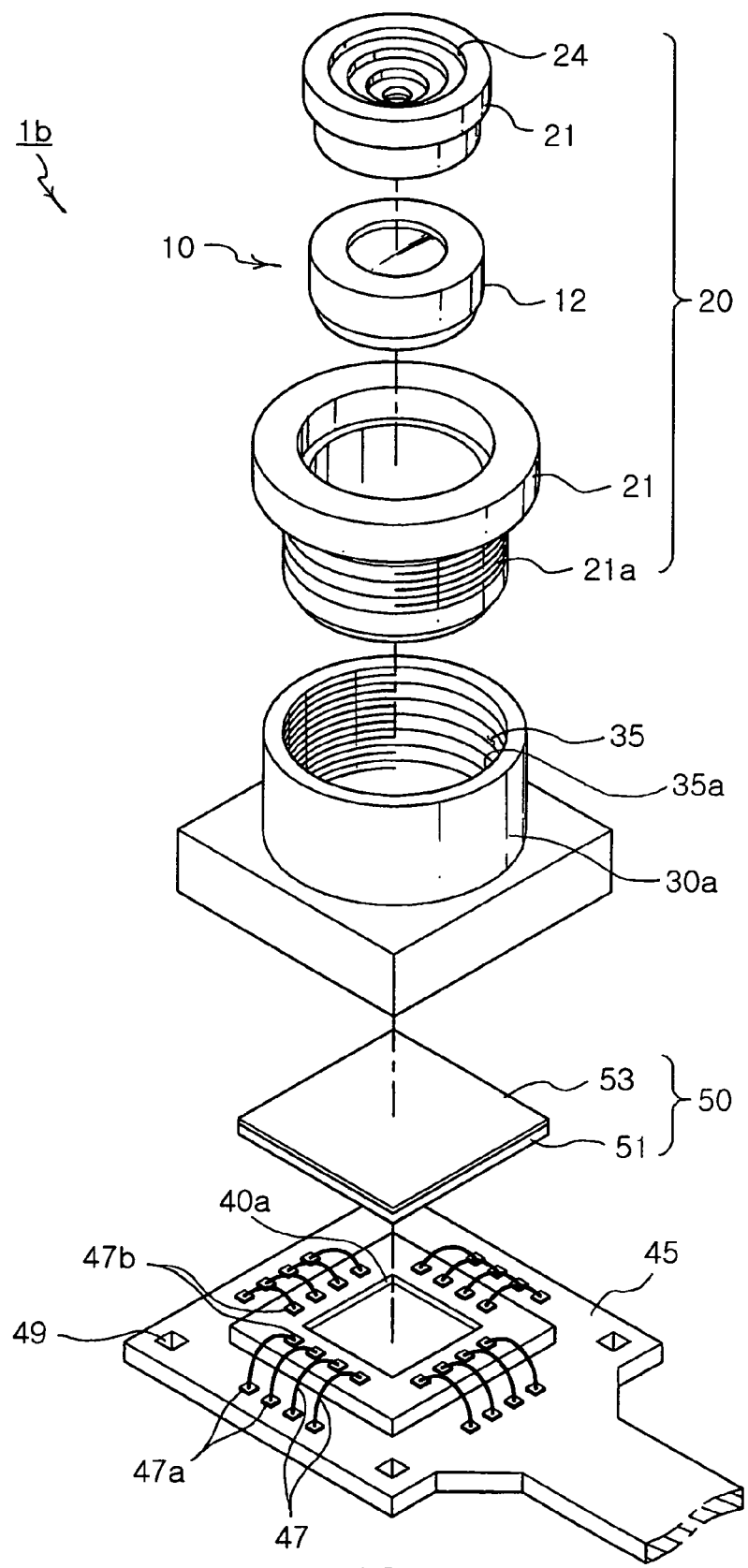
FIG. 4a is an exploded perspective view illustrating a camera module according to a third preferred embodiment of the present invention.
Figure 4B:
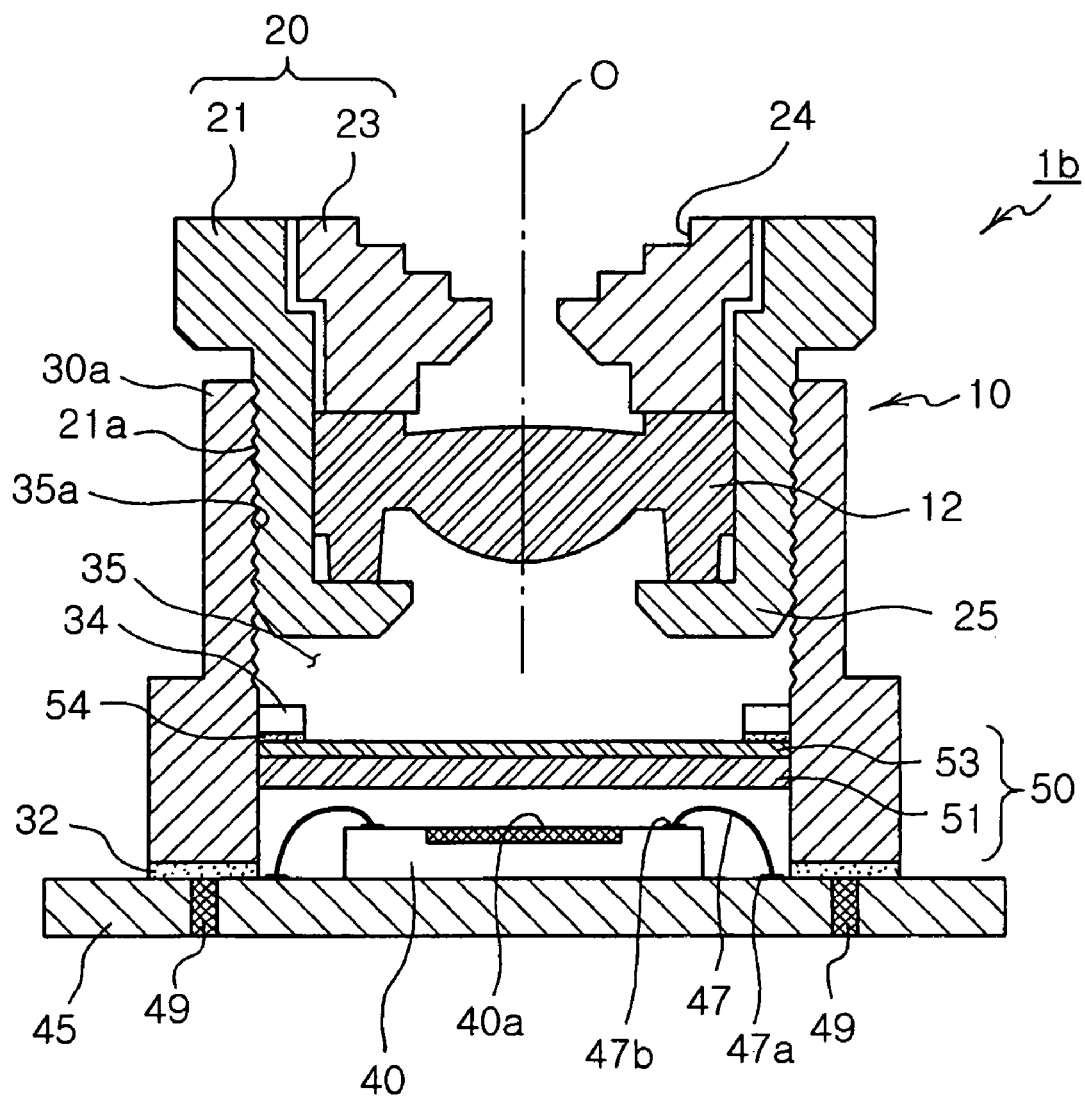
FIG. 4b is an assembled sectional view illustrating the camera module according to the third preferred embodiment of the present invention.

FIG. 4a is an exploded perspective view illustrating a camera module 1b according to a third preferred embodiment of the present invention, and FIG. 4b is an assembled sectional view illustrating the camera module 1b according to the third preferred embodiment of the present invention.

As shown in FIGS. 4a and 4b, the camera module 1b according to the third preferred embodiment of the present invention comprises a lens array 10, a lens accommodating unit 20, a housing 30a, an image sensor 40, and a filter 50. Components of the camera module according to the third preferred embodiment of the present invention, which correspond to those of the camera module according to the first or second preferred embodiment of the present invention, are indicated by the same reference numerals as those of the camera module according to the first or second preferred embodiment of the present invention, and a detailed description thereof will not be given.

The housing 30a of the camera module 1b is mounted on the upper surface of the circuit board 45 by a bonding agent applied to the lower end of the housing 30a such that the housing 30a is connected to at least one ground terminal 49 formed at the upper surface of the circuit board 45.

Preferably, the housing 30a is made of a material containing a conductive material, by which external noise or external injurious electromagnetic waves are prevented from being introduced to the image sensor 40, and the external noise or the external injurious electromagnetic waves are discharged out of the housing 30a through the ground terminal 49.

As shown in FIGS. 4a and 4b, a plurality of bonding pads 47a formed at the upper surface of the circuit board 45 is electrically connected to a plurality of bonding pads 47b formed at the upper surface of the image sensor 40 by metal wires 47 in a wire bonding fashion. In this way, the image sensor 40 of the camera module 1b is mounted to the circuit board 45 of the camera module 1b.

Figure 5A:
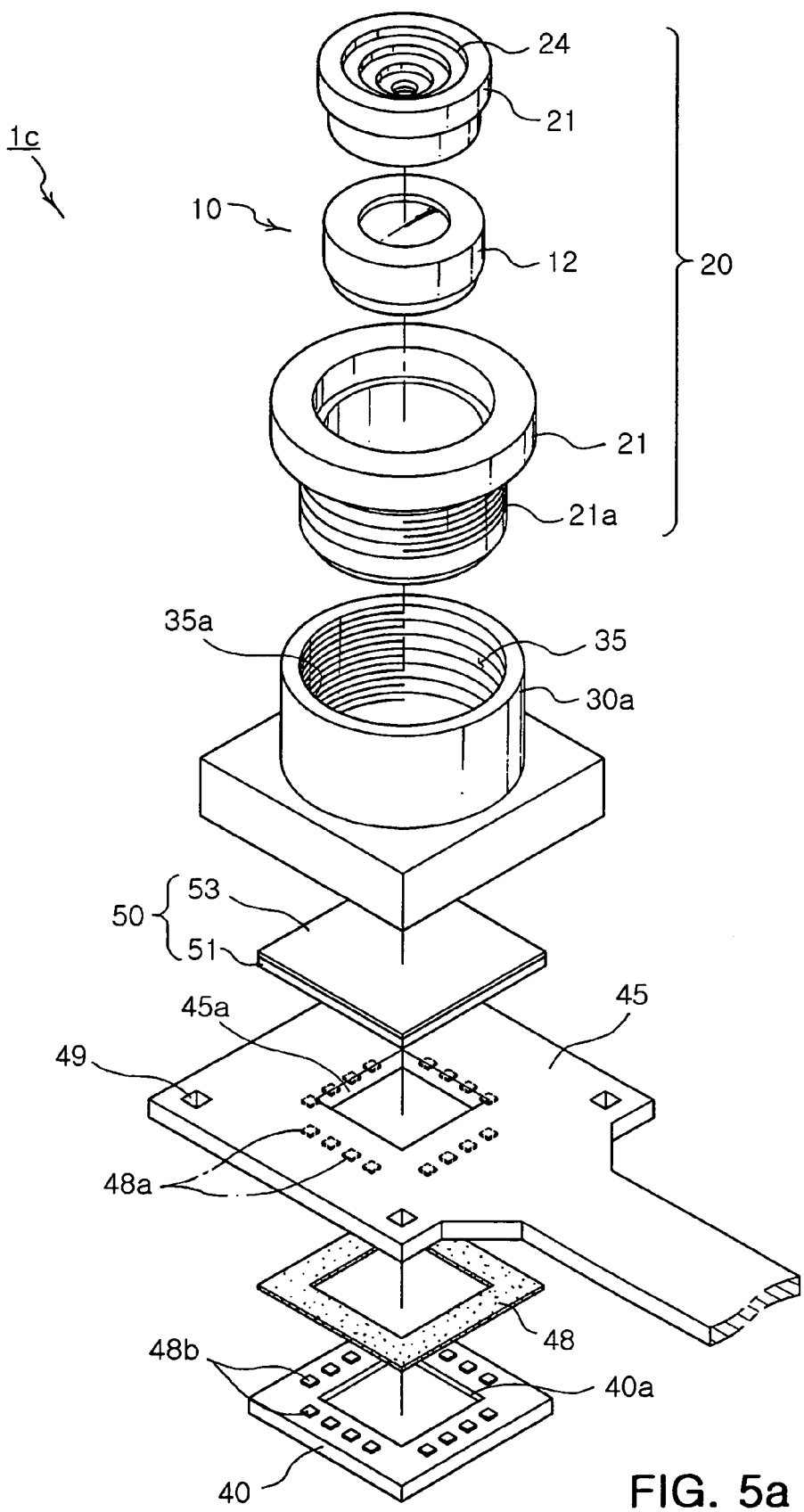
FIG. 5a is an exploded perspective view illustrating a camera module according to a fourth preferred embodiment of the present invention.
Figure 5B:
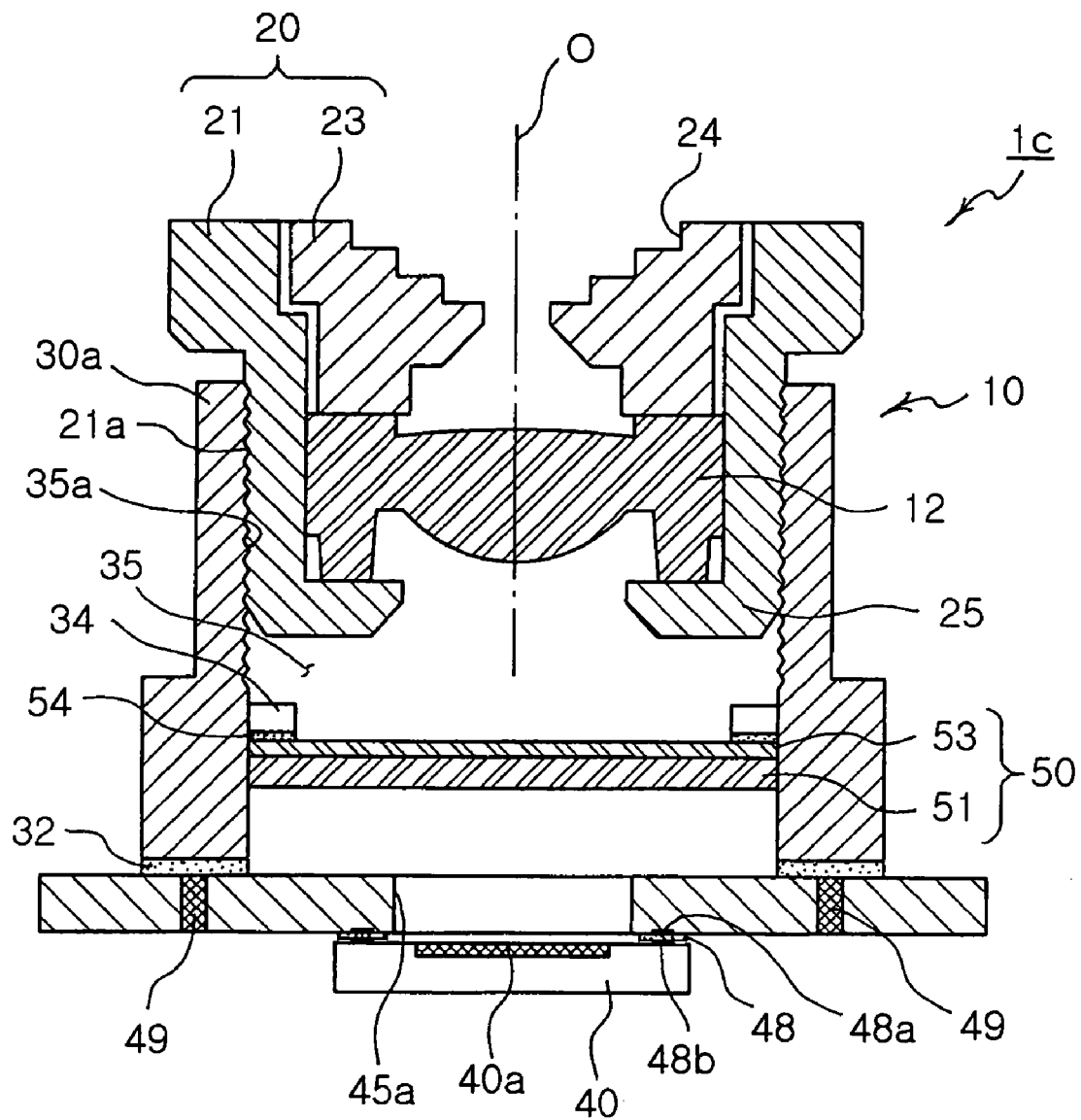
FIG. 5b is an assembled sectional view illustrating the camera module according to the fourth preferred embodiment of the present invention.

Alternatively, an image sensor 40 of the camera module 1c is mounted to a circuit board 45 of the camera module 1c, as shown in FIGS. 5a and 5b. Specifically, a plurality of bonding pads 48a of the circuit board 45 may be electrically connected to a plurality of bonding bumps 48b of the image sensor 40, respectively, by a bonding agent 48 applied between the circuit board 45 and the image sensor 40 in a flip chip bonding fashion.

Light introduced through the lens array 10 of the camera module 1; 1a; 1b; 1c with the above-stated construction passes through the transparent medium 51 of the prevention film 53 of the filter 50. At this time, ultraviolet rays included in the light are filtered. The light is focused on the image area 40a of the image sensor 40 such that a subject is formed in the shape of an image.

The image focused on the image area 40a is converted into an electric signal by the image sensor 40, and is then transmitted to a display unit (not shown), such as an LCD, through the circuit board 45 such that the image is reproduced on the display unit.

While the image is converted into an electric signal, a digital chip or a radio frequency (RF) circuit of the image sensor 40 mounted on the circuit board 45 generates electromagnetic waves, which are injurious to human health and may cause communication jamming of adjacent parts.

According to the present invention, however, the filter 50, which has the prevention film 53 for preventing the electromagnetic waves from being emitted out of the camera module, is mounted on the upper surface of the image sensor 40. Consequently, communication jamming due to the electromagnetic noise, which causes other instruments or systems to malfunction, is effectively prevented, and therefore, reliability of the camera module is improved, and stable operation of the camera module is ensured.

In the case that the lower end of the housing 30a made of the material containing the conductive material is electrically connected to the ground terminal 49 formed at the upper surface of the circuit board 45, external noise or external electromagnetic waves are discharged out of the camera module through the housing 30a, the conductive bonding agent 32 that fixes the housing 30a to the circuit board 45, and the ground terminal 49. Consequently, the external noise or the external electromagnetic waves are prevented from affecting the image sensor 40 mounted in the housing 30a, and therefore, communication jamming or malfunction of the image sensor 40 is maximally prevented.

In addition, electromagnetic waves generated from the image sensor 40 are maximally prevented from being emitted out of the camera module by the prevention film 53, and at the same time, the electromagnetic waves are discharged out of the camera module through the housing 30a, the conductive bonding agent 32 and the ground terminal 49. Consequently, the emission of electromagnetic waves out of the camera module is minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the filter having the transparent medium and the prevention film is disposed between the lens array and the image sensor, by which the structure for preventing electromagnetic waves generated by the image sensor from being emitted out of the camera module and preventing external electromagnetic waves and noise from being introduced into the camera module can be easily achieved without using additional parts. Consequently, the present invention has the effect of improving assembly efficiency of the camera module, decreasing the number of parts to be assembled, and thus, reducing the manufacturing costs of the camera module, and considerably decreasing the size of the camera module according to demand for miniaturization.

What is claimed is:

1. A camera module comprising:
    a lens array including at least one lens;
    a lens accommodating unit having an inner space defined therein such that the lens array is arranged along an optical axis in the inner space and an incident hole formed at the center of the front surface thereof;
    a housing mounted on the upper surface of a circuit board, the housing having a counter-engagement part engaged with an engagement part formed at the lens accommodating unit such that the lens accommodating unit is moved in the direction of the optical axis;

an image sensor having an image area on which light passing through the lens array is focused, the image sensor being electrically connected to the circuit board such that the image focused on the image area is transmitted to the circuit board; and a filter disposed between the lens array and the image sensor, the filter including a transparent medium through which light introduced along the optical axis is directly transmitted to the image area of the image sensor, and a prevention film for preventing electromagnetic waves generated by the image sensor disposed in the housing from being emitted out of the housing;

wherein the engagement part of the lens accommodating unit is a male thread part formed at the outer circumferential surface of the lens accommodating unit;

and wherein the counter-engagement part of the housing is a female threaded part formed at the inner hole of the housing.

2. The module as set forth in claim 1, wherein the lens accommodating unit comprises:

a hollow cylindrical barrel, in which the lens array is arranged, the barrel having the engagement part formed at the outer circumferential surface thereof, which is engaged with the counter-engagement part formed at an inner hole of the housing; and a cap having a male thread part formed at the outer circumferential surface thereof, which is threadly engaged with a female thread part formed at the inner circumferential surface of the barrel for fixing the lens array, the cap having the incident hole formed at the center of the front surface thereof.

3. The module as set forth in claim 1, wherein the housing is attached to the upper surface of the circuit board by a conductive bonding agent.

4. The module as set forth in claim 1, wherein the image sensor is mounted to the circuit board by metal wires in a wire bonding fashion.

5. The module as set forth in claim 1, wherein the image sensor is mounted to the circuit board by bonding bumps in a flip chip bonding fashion.

6. The module as set forth in claim 1, wherein the prevention film is a conductive layer uniformly coated on an entire area of the upper or lower surface of the transparent medium.

7. The module as set forth in claim 6, wherein the prevention film is made of Indium Tin Oxide (ITO).

8. The module as set forth in claim 1, wherein the prevention film is a conductive film bonded to an entire area of the upper or lower surface of the transparent medium.

9. The module as set forth in claim 1, wherein the filter is attached to the housing by a conductive bonding agent.

10. The module as set forth in claim 1, wherein the filter is attached to the upper surface of the image sensor by a conductive bonding agent.

11. A camera module comprising:

a lens array including at least one lens;

a lens accommodating unit having an inner space defined therein such that the lens array is arranged along an optical axis in the inner space and an incident hole formed at the center of the front surface thereof;

a housing mounted on the upper surface of a circuit board such that the housing is connected to at least one ground terminal of the circuit board, the housing having a counter-engagement part engaged with an engagement part formed at the lens accommodating unit such that the lens accommodating unit is moved in the direction of the optical axis;

an image sensor having an image area on which light passing through the lens array is focused, the image sensor being electrically connected to the circuit board such that the image focused on the image area is transmitted to the circuit board; and a filter disposed between the lens array and the image sensor, the filter including a transparent medium through which light introduced along the optical axis is directly transmitted to the image area of the image sensor, and a prevention film for preventing electromagnetic waves generated by the image sensor disposed in the housing from being emitted out of the housing;

wherein the engagement part of the lens accommodating unit is a male thread part formed at the outer circumferential surface of the lens accommodating unit, and wherein the counter-engagement part of the housing is a female thread part formed at the inner hole of the housing.

12. The module as set forth in claim 11, wherein the lens accommodating unit comprises:

a hollow cylindrical barrel, in which the lens array is arranged, the barrel having the engagement part formed at the outer circumferential surface thereof, which is engaged with the counter-engagement part formed at an inner hole of the housing; and a cap having a male thread part formed at the outer circumferential surface thereof, which is threadly engaged with a female thread part formed at the inner circumferential surface of the barrel for fixing the lens array, the cap having the incident hole formed at the center of the front surface thereof.

13. The module as set forth in claim 11, wherein the housing is made of a material containing a conductive material.

14. The module as set forth in claim 11, wherein the housing has a conductive layer of a conductive material uniformly coated on an entire area of the inner or outer surface thereof, the conductive layer of the housing being electrically connected to the at least one ground terminal of the circuit board.

15. The module as set forth in claim 11, wherein the housing is attached to the at least one ground terminal of the circuit board by a conductive bonding agent.

16. The module as set forth in claim 11, wherein the image sensor is mounted to the circuit board by metal wires in a wire bonding fashion.

17. The module as set forth in claim 11, wherein the image sensor is mounted to the circuit board by bumps in a flip chip bonding fashion.

18. The module as set forth in claim 11, wherein the prevention film is a conductive film bonded to an entire area of the upper or lower surface of the transparent medium.

19. The module as set forth in claim 18, wherein the prevention film is made of Indium Tin Oxide (ITO).

20. The module as set forth in claim 11, wherein the filter is attached to the housing by a conductive bonding agent.

21. The module as set forth in claim 11, wherein the filter is attached to the upper surface of the image sensor by a conductive bonding agent.

* * * * *